July 17, 1962 K. G. HOER 3,044,768
FACSIMILE APPARATUS
Filed June 4, 1956 9 Sheets-Sheet 2

*Inventor*
K. G. HOER
By Robert Harding Jr.
*Attorney*

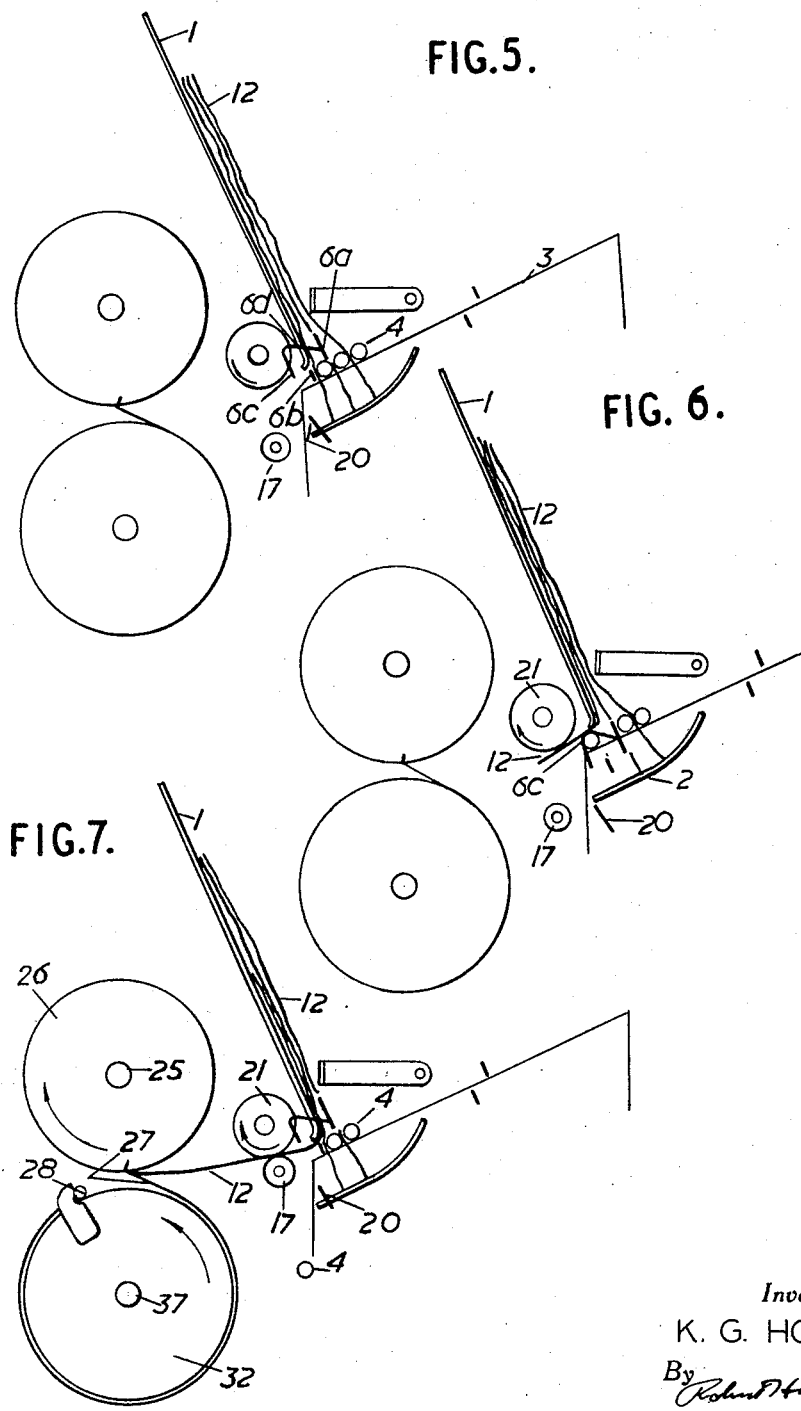

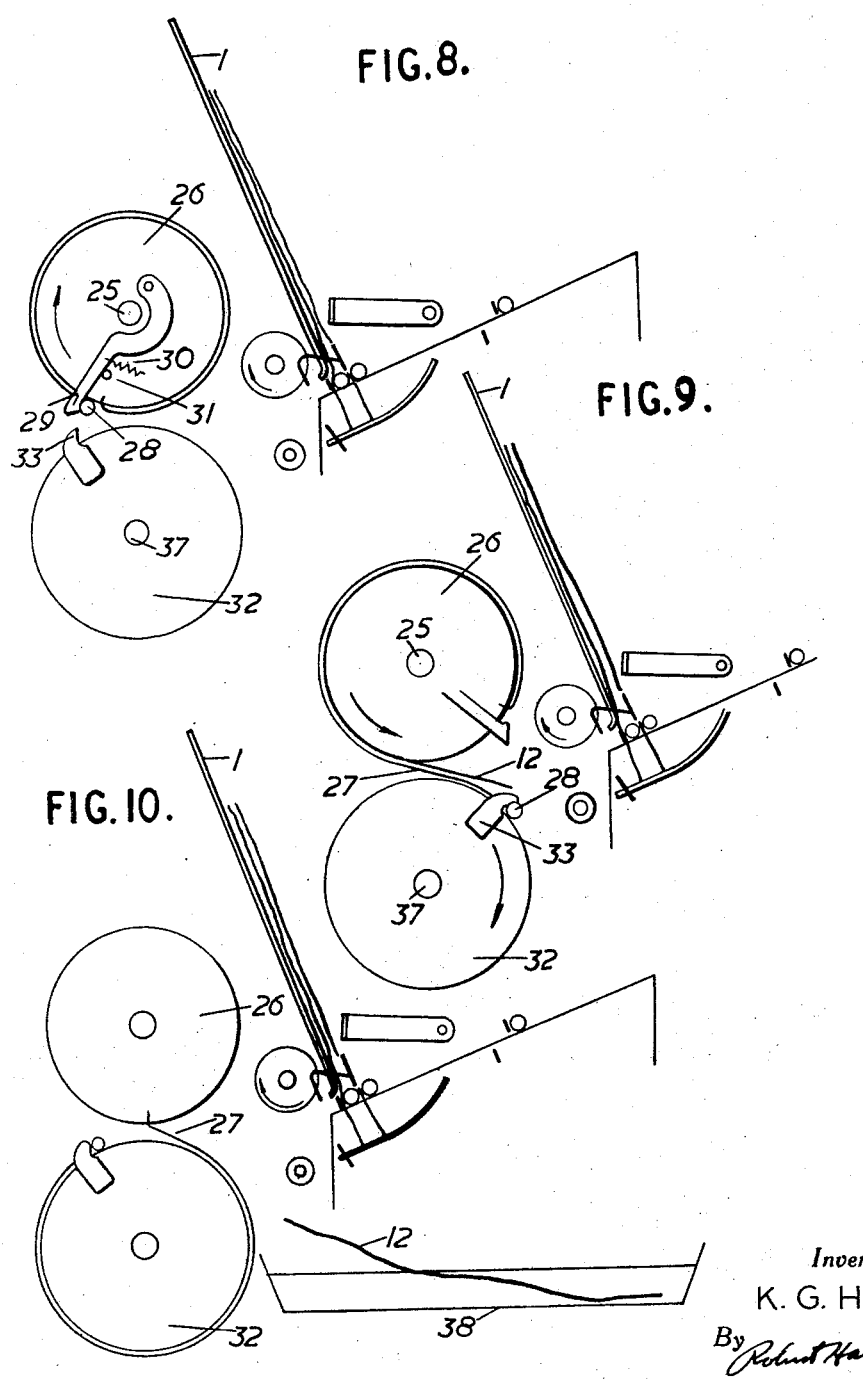

July 17, 1962  K. G. HOER  3,044,768
FACSIMILE APPARATUS

Filed June 4, 1956  9 Sheets-Sheet 5

Inventor

K. G. HOER

By *Robert D. Harding Jr.*
  Attorney

July 17, 1962  K. G. HOER  3,044,768
FACSIMILE APPARATUS
Filed June 4, 1956  9 Sheets-Sheet 6
FIG. 12.
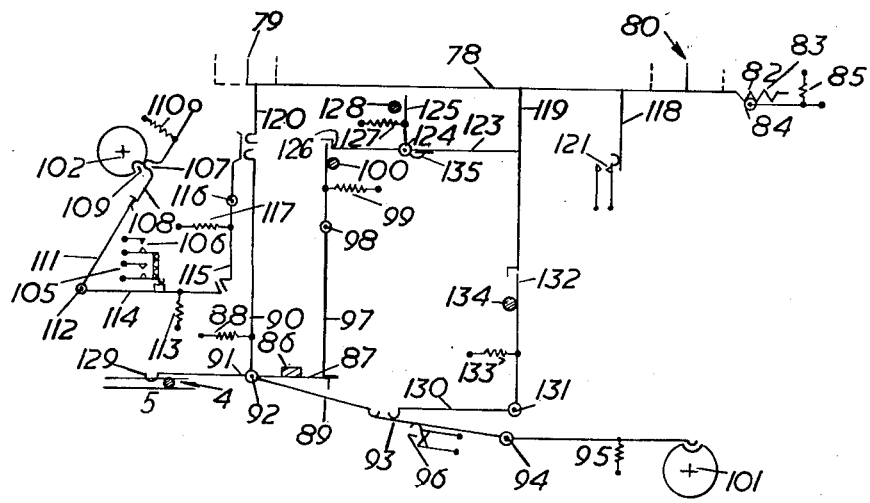
FIG. 13.
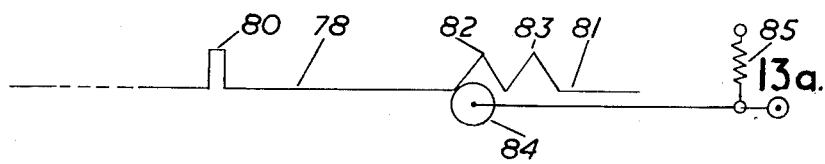
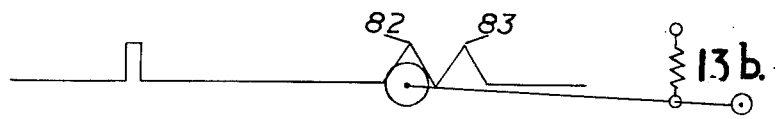
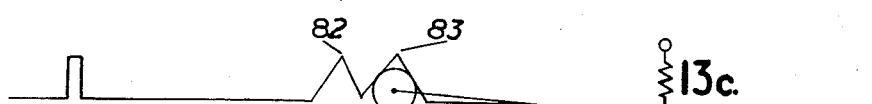
Inventor
K. G. HOER
By
Attorney July 17, 1962 K. G. HOER 3,044,768
FACSIMILE APPARATUS
Filed June 4, 1956 9 Sheets-Sheet 7

Inventor
K. G. HOER
By Robert Harding Jr.
Attorney

July 17, 1962 K. G. HOER 3,044,768
FACSIMILE APPARATUS

Filed June 4, 1956 9 Sheets-Sheet 8

Inventor
K. G. HOER
By *Robert Harding Jr.*
Attorney

July 17, 1962 K. G. HOER 3,044,768
FACSIMILE APPARATUS

Filed June 4, 1956 9 Sheets-Sheet 9

Inventor
K. G. HOER
By *Robert Harding Jr*
Attorney

# United States Patent Office 3,044,768
Patented July 17, 1962

3,044,768
FACSIMILE APPARATUS
Kenneth George Hoer, Croydon, England, assignor to Creed & Company Limited, Croydon, England, a British company
Filed June 4, 1956, Ser. No. 589,267
Claims priority, application Great Britain June 3, 1955
10 Claims. (Cl. 271—4)

This invention relates to facsimile apparatus and has for its object the provision of improved automatic arrangements for feeding message sheets into such apparatus.

In most facsimile machines the sheet of paper or other material to be scanned is loaded directly onto a scanner. This has been done by a variety of methods including wrapping the sheet around a drum and retaining it by one or more elastic garters, trapping the sheet inside a transparent wrapper, and placing the sheet inside a transparent drum which has expanding members inside it to hold the sheet against the inside face of the drum. However, all these methods require a single sheet to be loaded and unloaded by hand, which wastes valuable transmission time and requires a considerable amount of operator supervision. It is therefore desirable that successive message sheets and recording blanks should be supplied automatically to the transmitter and the recorder respectively.

In automatic facsimile apparatus it is clearly necessary that, when a message has been scanned, the scanning head should be returned as quickly as possible to the standby position preparatory to scanning the next message. Indeed if this were not done and the scanning head were returned at the scanning speed, there might be no overall saving in transmission time in having an automatic message-loading arrangement. A fast drive is therefore provided in the present invention for returning the scanning head to the standby position.

The facsimile transmitter to be hereinafter described is also designed to accommodate message forms of various sizes in random sequence. Again there would be a waste of transmission time in the scanning head traversing the whole width of the scanner at normal scanning speed if the messages to be scanned were shorter than the full scanner width. It is therefore arranged that the scanning head is driven at scanning speed only over the portion of the scanner occupied by a message form.

As the transmitter is designed to accept various sizes of message form, it will happen that, when forms of less than maximum length are used, part of the scanner will be exposed and presented to the scanning head. It is, however, important, in a facsimile transmitter having automatic accommodation to various tints of message form, that at no time during the scanning operation shall the scanning head receive light from any surface brighter than the message form itself. The scanner must therefore be no lighter in hue than the darkest message form.

It therefore follows that, when a relatively light message form is used, the scanner will appear dark in comparison and will cause black to be printed on the received copy in those areas corresponding to the bare parts of the scanner. This is objectionable, and to avoid this trouble it is necessary to apply to the picture transmission channel a white signal, derived independently of the scanning head, during such times as the bare scanner is subject to the scrutiny of the scanning head.

This is achieved by mechanically sensing the length of the message form as it is loaded to the scanner, and automatically adjusting the timing of two contact pairs. In the embodiment to be described the scanner is a drum and the contact pairs are closed momentarily once in each revolution of the drum, thereby causing corresponding adjustment in the period during each drum revolution for which the white signal (normally referred to as the blanking signal) is injected into the picture channel.

The nature of the invention and the best method of performing the invention will be better understood from the following description taken in conjunction with the accompanying drawings, in which:

FIGS. 2 to 10 show diagrammatically the apparatus of FIG. 1 in various stages of handling sheets of paper.

FIG. 12 shows schematically the operation of electrical contacts during automatic transmission of a plurality of messages by the transmitter of FIG. 1.

Figure 14:
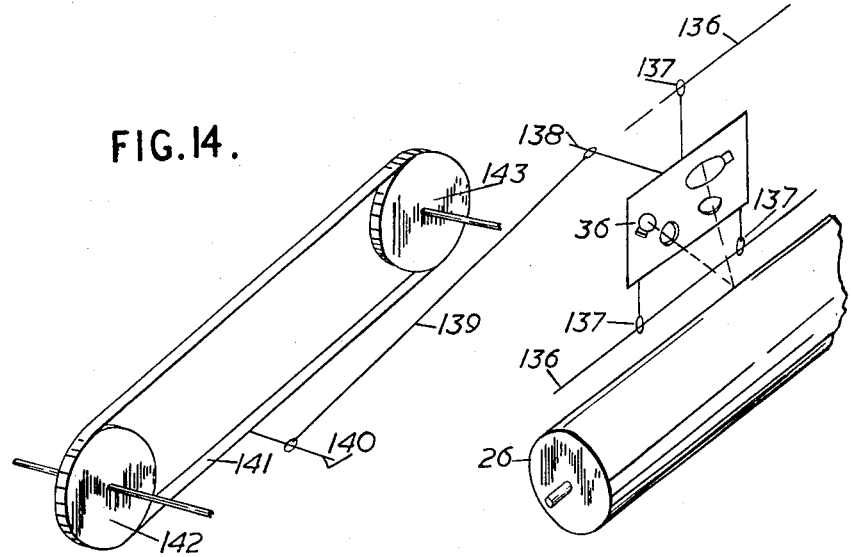
Figure 15:
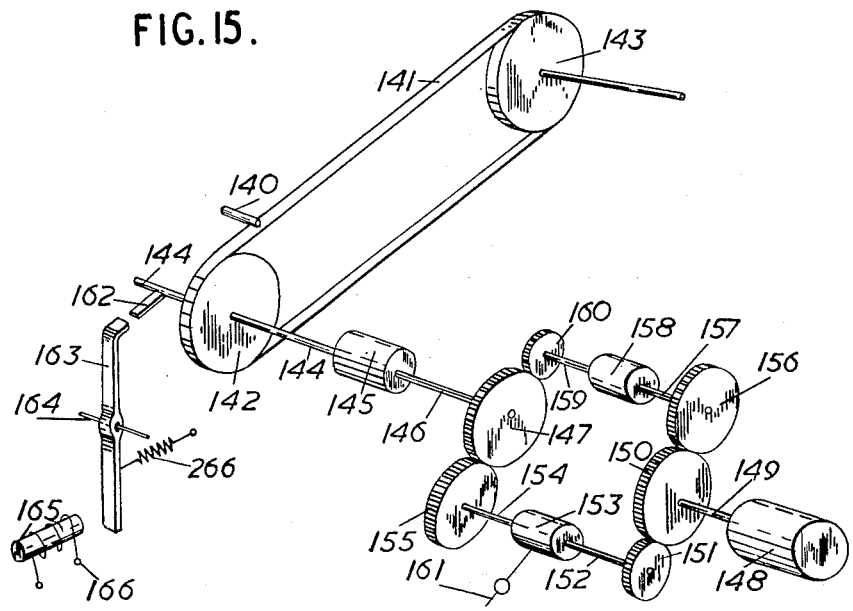
Figure 18:
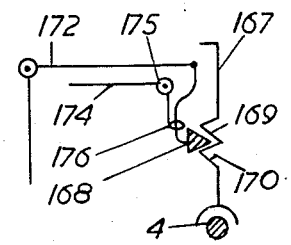
Figure 19:
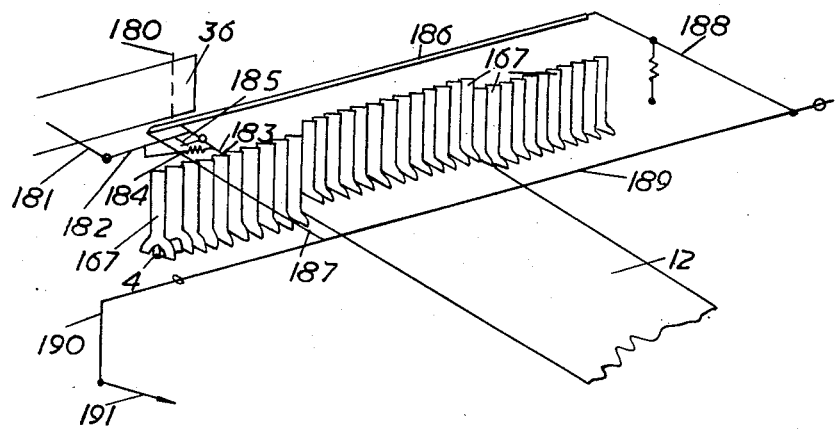
Figure 20:
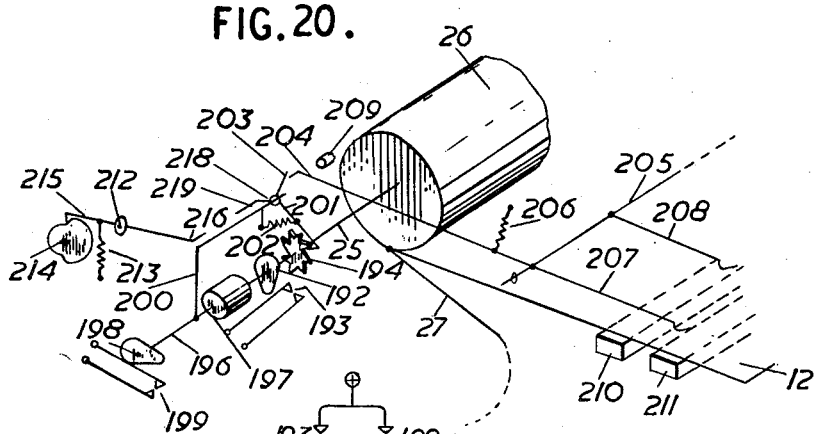
Figure 21:
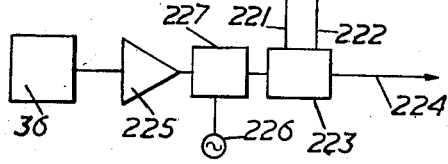

FIG. 13 shows in detail the movement of a portion of the mechanism of FIG. 12 wherein FIGS. 13a, 13b, 13c, represent schematically positions of unstable and stable equilibrium respectively, FIGS. 14 and 15 illustrate schematically the scanning head drive mechanism, FIGS. 16 to 19 illustrate schematically the sensing mechanism for determining the length of a message sheet, and FIGS. 20 to 21 illustrate schematically the scanning mechanism for determining the width of a message sheet.

MAGAZINE MECHANISM

The magazine mechanism will be described in connection with a facsimile transmitter employing an optical scanning arrangement scanning a message sheet on a drum. It will, however, be understood by those skilled in the art that it may be equally well used in conjunction with other types of facsimile transmitters or in conjunction with recorders in which messages are to be recorded on individual sheets.

Referring to the accompanying drawings and more particularly to FIGS. 1 and 2 in which the apparatus is shown in the loading position, a desk 1 is placed tilted at such an angle that a sheet of paper having one edge resting on a platform 2 below the desk 1 would lean conveniently against the desk 1. The desk 1 is shown as a plane member inclined slightly to the vertical. It might equally well be slightly curved provided that a message sheet can lean conveniently against it. The platform 2 is positioned a small distance below the desk 1 so that there is a gap between it and the desk 1 through which a sheet of paper may be drawn. On either side of the desk 1 and platform 2 there is a guide rail or plate 3 which slopes downwards towards the lower edge of the desk 1 and passes beyond it at such a height as to permit rods 4 to pass just under the lower edge of the desk 1 when they run down the guide rails 3. The rods 4 are prevented from running unchecked down the guide rails 3 by two sets of arms 5 and 6, each of which has an escapement for the rods formed at its end. The escapement at the end of the arms 5 consists of two teeth 5a, 5b, and that at the end of the arms 6 consists of three teeth 6a, 6b, 6c. In addition tooth 6c has associated with it a cam face 6d. It can be seen from FIG. 1 that the escapement arms 5 and 6 are set beyond the width of desk 1 and platform 2, so that they cannot interfere with any message sheets which may be inserted.

Figure 4:
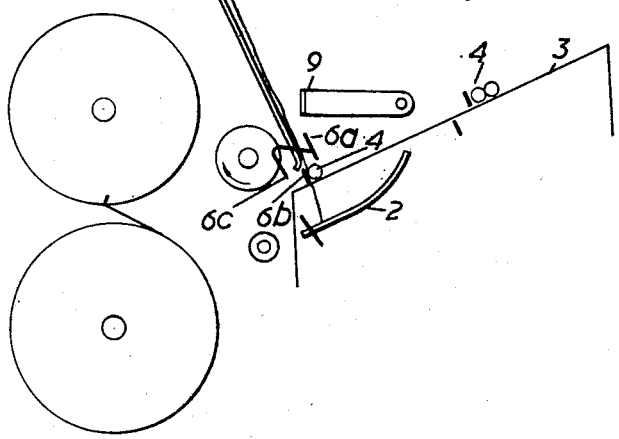

The arms 5 are coupled by a shaft 7 which has fixed to it an additional member 8, the end of which can be pushed downwards by a projection 9a on a frame 9. The shaft 7 and arms 5 are under the influence of a spring 10 which tends to pull them upwards. In the rest position, as shown in FIGS. 1 and 2, the frame 9 is in the forward"

position with respect to its pivots 11 and the projection 9a presses member 8 downwards, overcoming the force of the spring 10 so that member 8 is held against stop pin 13. Thus the arm 5 is pressed downwards as far as it will go and any rods 4 which are further up the guide rails 3 than tooth 5a will be held by tooth 5a. In its forward position frame 9 will ensure that any sheet of paper 12 (see FIG. 4) is kept resting close to the desk 1.

Arms 6 are coupled together by a shaft 14 (FIG. 1), which shaft is controlled by a control unit 15. (The operation of control unit 15 will be described later with reference to FIG. 11.) Also fixed to shaft 14 are a trip arm 16, which controls the release of a pressure feed roller 17 via arm 18 and latch 19, and a frame 20 which prevents any sheets of paper from slipping off platform 2 except when shaft 14 is rotated slightly and frame 20 is consequently rocked below platform 2. Behind the lower edge of desk 1 and as close to it as possible is a feed roller 21 which is used to draw a sheet of paper from the magazine as it is selected.

Figure 1:
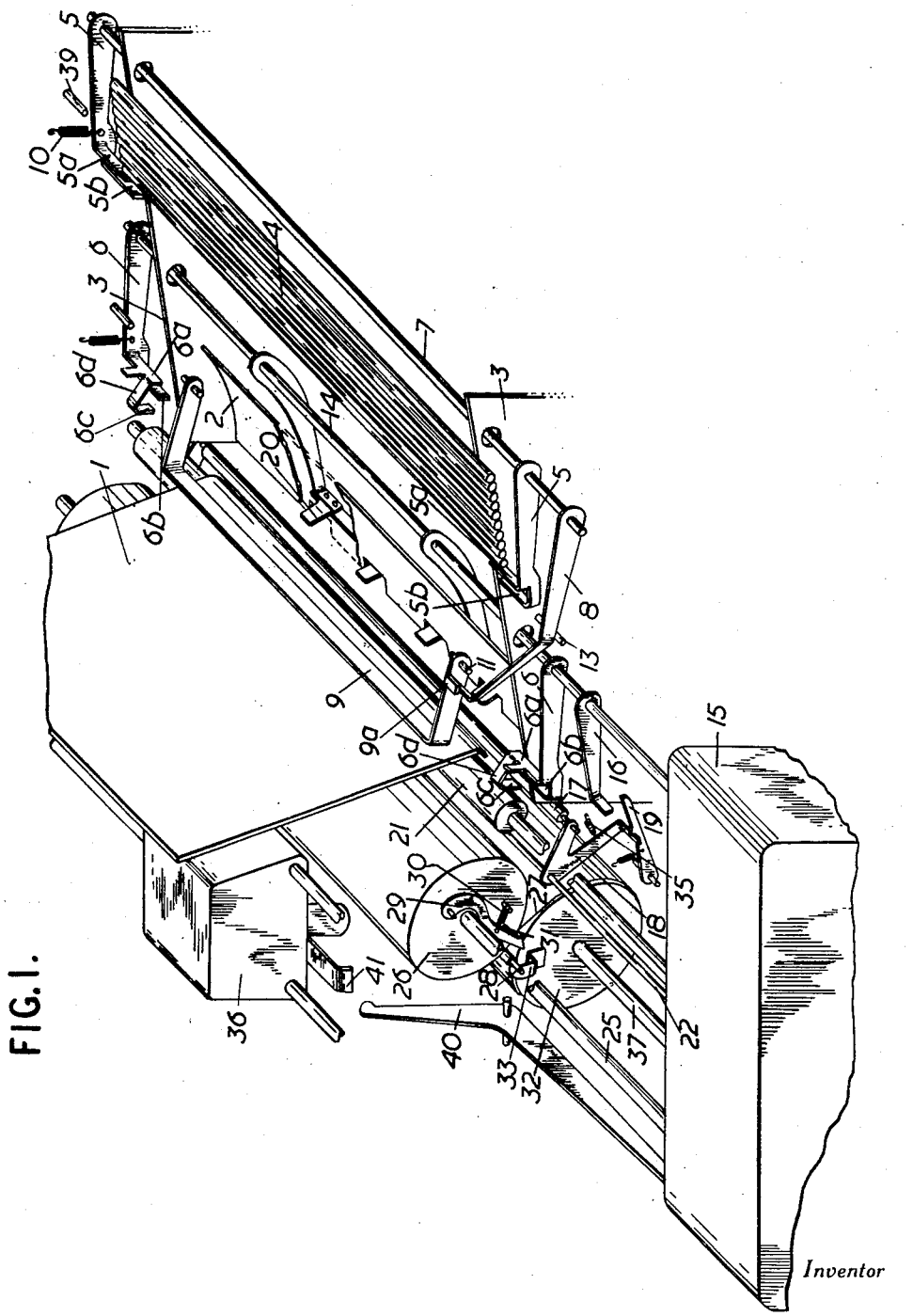
FIG. 1 shows an exploded perspective view of a facsimile transmitter according to the invention with certain parts broken away.
Figure 2:
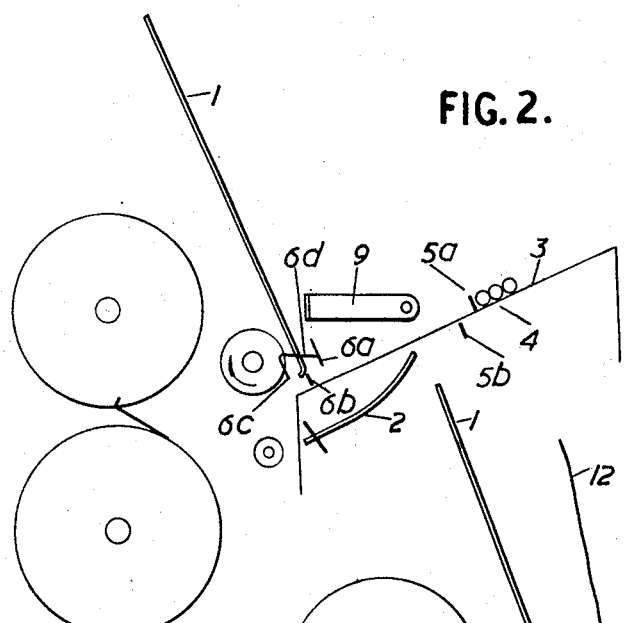

It should be noted that, while only three rods 4 are shown in FIGS. 2 to 10 for the sake of clarity and ten are shown in FIG. 1, any number may be used.

OPERATION OF MAGAZINE MECHANISM

(a) Loading

Figure 3:
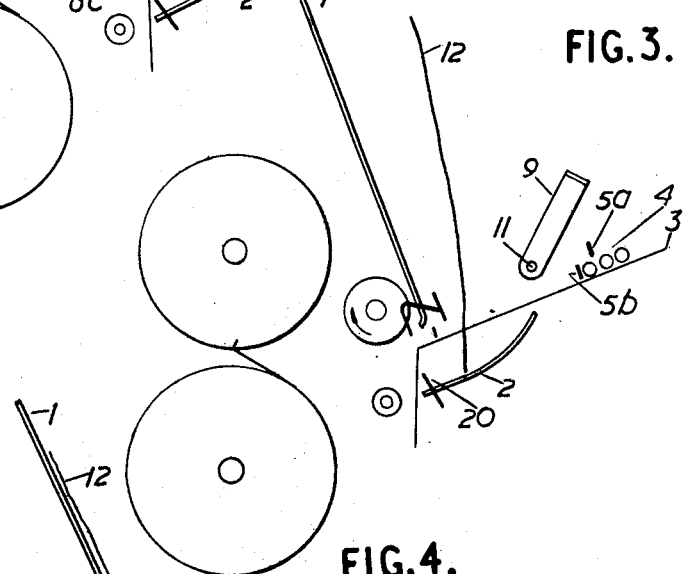

When the magazine is to be loaded, frame 9 is swung away from the desk 1 to the backward position as shown in FIG. 3. The edge of a sheet of paper 12 may then be placed on the platform 2 and later rested against the desk 1. The movement of frame 9 to the backward position removes the pressure of projection 9a on arm 8 so that arms 8 and 5 are allowed to rise under the action of spring 10 until the further arm of the pair 5 (as seen in FIG. 1) rests against stop pin 39. This upward movement of arms 5 brings tooth 5a, which had previously been holding the rods 4, above their level (FIG. 3) and tooth 5b into their path. The rods 4 are therefore allowed to roll down guide rails 3 to rest against the second tooth 5b of this escapement.

Frame 9 is now swung back by hand to its original position (see FIG. 4), thus ensuring that the sheet 12 rests against desk 1, while at the same time resetting the escapement on arms 5 via arm 8. In the reset position tooth 5a is brought down between the first and second of the rods 4, and tooth 5b is moved below the level of the first rod 4 so that this first rod 4 is free to run down the guide rails 3 until it rests against tooth 6b of escapement arms 6, thrusting the sheet 12 before it.

The action of swinging frame 9 backwards and forwards and placing individual sheets 12 on platform 2 is repeated until all the rods 4 have been released from behind escapement arms 5 or until all the material to be transmitted has been placed in the magazine. The rods 4 are then resting one behind the other against tooth 6b of escapement arms 6 with a sheet 12 in front of each rod, as shown in FIG. 5. This completes the loading of the magazine.

(b) Unloading

The control unit 15 (FIG. 1) is released by means which are not shown in FIG. 1 but will be explained later in connection with FIG. 11. Control unit 15 rocks the shaft 14, causing the various members, arms 6, trip arm 16 and frame 20, associated with shaft 14 to move downwards. As the arms 6 swing downwards, tooth 6a moves between the first and second rods 4 and the cam face 6d forces the first rod 4 further down the guide rails 3 until it is held in position against tooth 6c just past and immediately below the lower edge of the desk 1 (see FIG. 6). The second rod 4, however, is retained in its position by tooth 6a. At the same time frame 20 moves below the platform 2. As the first sheet 12 was resting against the desk 1 in front of the first rod 4, the movement of the first rod 4 to the position described will cause that section of this first sheet 12 which reached below desk 1 to platform 2 to be wrapped underneath the lower edge of desk 1, as shown in FIG. 6. The edge of the sheet 12 is then positioned underneath and just beyond feed roller 21.

Trip arm 16, which also moves downwards as shaft 14 rocks, is arranged to release latch 19 after the movements described above have been completed. The release of latch 19 allows arm 18, with pressure roller 17, to swing about the centre of shaft 22 under the influence of spring 35 until pressure roller 17 holds the sheet 12 firmly against the feed roller 21. This feed roller 21 is rotated by control unit 15 and immediately draws sheet 12 from its position against desk 1 and extracts it from the magazine as shown in FIG. 7.

Immediately the pressure roller 17 is released the shaft 14 is rocked back to its original position by control unit 15. Frame 20 is thus restored to its initial position and prevents the edge of the next sheet 12 from being drawn over the edge of patform 2 by the disturbance caused when the first sheet 12 is drawn away. The escapement arms 6 also swing back to the rest position and the first rod 4 is released by tooth 6c and falls off the ends of guide rails 3 away from the mechanism. It can then be replaced at the top of guide rails 3 to commence another cycle either later by hand or immediately by mechanical means, such as a pair of rotating worms (not shown).

The return of escapement arms 6 to their rest position causes tooth 6a to move out of the path of the second rod 4 which then rolls down guide rails 3 to tooth 6b which will be in its path. As it rolls down the guide rails 3 to this position, the second rod 4 moves before it the second sheet 12, and the remaining rod or rods 4 each moves down into the vacant position bringing with it its respective sheet 12, as shown in FIG. 7.

It will be understood that while the operation of the magazine has been described and shown as employing rods 4 of circular cross-section, any member, which will move down an inclined plane, such as that defined by guide rails 3, when released from an escapement such as 5, may be used. For example plane strips might well be used instead of rods 4.

The unloading cycle of the magazine is completed by the resetting of pressure roller 17. This resetting is done by shaft 22 under the control of unit 15, shaft 22 being turned until the arm 18 is latched behind latch 19.

SCANNING MECHANISM

Mounted on a shaft 25 (FIGS. 1 and 8) is the scanning drum 26. Drum 26 has pivotally secured to it, by one end only, a transparent wrapper 27. In the free end of this wrapper 27 there is incorporated a rod or stiffening member 28 which, when the wrapper is wrapped around the scanning drum 26, slips over two latch arms 29, situated one at each end of the scanning drum 26, and is held by them. These latch arms 29 are held by springs 30 against pins 31. Associated with this scanning drum 26 is a stripper drum 32 which, in certain phases of loading and unloading sheets 12 from the magazine, strips back the wrapper 27 from the scanning drum 26 and in so doing wraps the wrapper 27 around itself. The free end of the wrapper 27 is transferred from the scanning drum 26 to the stripper drum 32 by compliant claws 33 fixed one at each end of the stripper drum 32. These claws 33 engage the stiffening member 28 of the wrapper 27, as shown in FIGS. 7, 9 and 10.

OPERATION OF SCANNING MECHANISM

While the magazine is being loaded, the scanning drum 26 is kept in a rest position by control unit 15. In the rest position the wrapper is wound round the scanning drum 26 and when transmission is to be started control unit 15 is operated and the wrapper is brought into the loading position. In the loading position the wrapper 27 is held stripped back on to stripper drum 32 (as shown in FIG. 7). The wrapper 27 has therefore left the surface of the scanning drum 26 right back to the point of its attachment. In this position a pocket between the scanning drum 26 and the wrapper 27 is presented to a sheet 12 emerging from the magazine. Sheets 12 are directed from the feed roller 21 of the magazine into this pocket. The scanning drum 26 is released and rotated by the control unit 15 via shaft 25, as soon as the edge of the sheet 12 is fed from the feed roller 21 into this pocket.

The surface speeds of the scanning drum 26 and the feed roller 21 are arranged to correspond, so that as the feed roller 21 continues to expel sheet 12 the scanning drum 26 will wind it on, trapped inside the wrapper 27 which is being wound on at the same time. This continues until the sheet 12 is completely transferred from the magazine to the scanning drum 26. At the same time as the scanning drum 26 is winding up the wrapper 27, the wrapper 27 is unwound from the stripper drum 32. The rotation of stripper drum 32 at the required speed and in the appropriate direction is effected in the embodiment described by motivation by control unit 15, but it could be effected solely by the tension in wrapper 27 caused by its being wound on to drum 26. When the scanning drum 26 has completed approximately one revolution, the stiffening member 28 of the wrapper 27 clips over the latch arms 29 of the scanning drum 26 as the claws 33 of the stripper drum 32 coincide with latch arms 29 (FIG. 8). The wrapper stiffening member 28 is, therefore, drawn off the claws 33, and the scanning drum 26, with the wrapper 27 trapping the sheet 12, is free to rotate while a conventional scanning unit 36 (FIG. 1) not here described in detail, makes a complete scan of the sheet 12 through the wrapper 27. At the completion of this scan, drum 26 is brought to rest by control unit 15 with stiffening member 28 lying directly between shafts 25 and 37. The control unit 15 is then tripped by the abutment of its member 40 (see also FIG. 11 and the description relating thereto) and member 41 of scanning unit 36, and it commences to rotate and turn the stripper drum 32 in a clockwise direction via shaft 37. The claws 33 associated with the stripper drum 32 then pick up the wrapper stiffening member 28 which lies in their path, unclipping the stiffening member 28 from the latch arms 29. At the same time a reverse drive is imparted to scanning drum 26 by control unit 15. The stripper drum 32 continues to rotate, winding on to itself the wrapper 27 which is unwinding from the scanning drum 26 (see FIG. 9). The sheet 12, owing to its natural stiffness, does not follow the wrapper 27 as it winds on to the stripper drum 32 but thrusts away from both the scanning and stripper drums 26 and 32 as the wrapper 27 is unwound from the scanning drum 26. This action continues until the stripper drum 32 has returned to its unloaded position, and the wrapper 27 is wound completely on to the stripper drum 32 with the end of the wrapper 27 fixed to the scanning drum 26 thus reforming the pocket described at the commencement of this description (see FIG. 10). By this time the sheet 12 will have completely disengaged itself from the scanning drum 26 and wrapper 27 and dropped into a tray 38. The loading of the next sheet 12 then takes place in the manner already described. If there is no further sheet to be loaded the loading action takes place just the same but the system is stopped before any scanning starts. The method by which the continuity of transmission is maintained while messages are to be sent, and then is stopped will be explained in connection with FIG. 12. In the rest position, therefore, the wrapper 27 is wound around scanning drum 26, as already mentioned.

OPERATION OF CONTROL UNIT

(a) Mechanical Operations

The operation of control unit 15 will now be explained with particular reference to FIG. 11.

When control unit 15 is to be started from rest two operations are necessary. Motor 42 must be energised and member 40 must be moved in the direction of the arrow. These operation may both be performed by the manual operation of a start button. When motor 42 is energised it drives shafts 43 and 44 through gears 45, shaft 46 and gears 47 and 48 respectively. Shaft 43 is arranged to drive, through a friction clutch 49, the shaft 25 on which the scanning drum 26 is mounted. Shaft 44 drives a ratchet clutch 50, and, when this ratchet clutch 50 is engaged, shaft 44 drives shaft 37, on which the stripper drum 32 is mounted, through mechanism which will be described in detail below.

Member 40 is pivoted at point 51 and carries a second arm 52 which is spring urged in a clockwise direction by spring 53. However the starting movement of member 40 causes arm 52 to move momentarily in an anticlockwise direction, releasing a tripper mechanism consisting of arms 54, 55, 56. This tripper mechanism had been held against the action of a spring 57 by arm 54 which was latched with arm 52. The release of this latch by the starting operation enables the tripper mechanism to move under the action of spring 57 until arm 55 abuts against the stop 58. In the un-latched position of the tripper mechanism the arm 55 is in the path of an arm 59 mounted on shaft 25, so that the shaft 25 is prevented from revolving under the drive from motor 42, and friction clutch 49 overrides.

The movement of arm 56 of the tripper mechanism in a clockwise direction draws a link 60 and a stop member 61 attached thereto out of engagement with bellcrank 62 and allows the engagement of detent 67 in ratchet wheel 50 under the action of spring 63. The shaft 44 then drives shaft 64 through ratchet clutch 50 and arm 65. Mounted on shaft 64 is a cam sleeve 66 having cam followers (not shown) which are spring urged to follow the contours of their respective cams on the cam sleeve 66. These cam followers, under the control of their respective cams, control the movements of shafts 14 and 22 (FIG. 1).

Another cam on cam sleeve 66 controls an arm 68 which, during a revolution of cam sleeve 66, draws stop member 61 down into the path of bellcrank 62 again. This movement occurs early in the revolution of cam sleeve 66 in fact as soon as practicable after bell-crank 62 has moved clear of the lower position of stop member 61 and causes the tripper mechanism to move in an anticlockwise direction against spring 57 and forces arm 54 up into latch engagement with arm 52. Stop member 61 is therefore returned to its rest position in the path of bellcrank 62 and retained there, while arm 55 is moved out of the path of the arm 59 on shaft 25. Shaft 25 would thus be free to be driven by shaft 43 through friction clutch 49 were it not for the fact that shaft 25 is at this time controlled by gear wheel 69, as will be described later. The return of stop member 61 to its rest position means that ratchet clutch 50 will be disengaged at the end of one revolution so that the rotation of shaft 64 is limited to one revolution for each operation of member 40.

Other operations performed from the cam sleeve 66 on shaft 64 will be described later. Shaft 64 may be used to give the drive for feed roller 21 directly.

Shaft 64 carries an arm 70 which is arranged to drive the gear segment 73 through link 71 and arm 72. The length of arm 72 is arranged to be about twice the length of arm 70 (see FIG. 11a), so that, during a half revolution of shaft 64, arm 72 is moved through an angle of the order of 60° (in an anti-clockwise direction as seen in FIGS. 11 and 11a). In order to make certain that arm 72 is moved through this angle in exactly the first half revolution of shaft 64, arm 70 and link 71 must be in a straight line in the rest position. Then, as shaft 64 performs the second half of its revolution, arm 70 and link 71 move arm 72 back to retrace the angle of approximately 60° which it traced in the first half of the revolution of shaft 64. This retrace movement of arm 72 is in a clockwise direction. As arm 72 moves, so does gear segment 73, because both are mounted on the shaft 76. Thus gear segment 73 executes an angular movement of approximately 60° in an anti-clockwise direction, followed by the same angular movement in a clockwise direction. As the arm 70 moves at constant speed in a circle and arm 72 moves only through a small portion of a circle, the motion of arm 72 approximates to simple harmonic motion. Arm 72 and gear segment 73 are thus brought smoothly to rest at the completion of their 60° movement and then smoothly accelerated in the reverse direction.

Gear segment 73 engages with a toothed wheel 74 on shaft 37 of the stripper drum 32. The radius of the toothed wheel 74 is arranged to be such that wheel 74 and shaft 37 perform one complete revolution during the angular movement of 60° performed by gear segment 73. Therefore gear wheel 74 and shaft 37 together perform one clockwise revolution followed by one anticlockwise revolution during one revolution of shaft 64. Also on shaft 37 is a gear wheel 69 which has a cut-out portion 77 in it. The gear wheel 69 is so positioned that its teeth will engage with the teeth of another gear wheel 75 on the shaft 25 of the scanning drum 26, except when the cut-out portion 77 is exactly opposite wheel 75 (as shown in FIG. 11 where gear wheel 69 is in its rest position).

As the ratchet clutch 50 engages and shaft 64 starts to revolve, so gear wheel 69 (through the mechanism described) starts to move in a clockwise direction. This movement of gear wheel 69 immediately takes the cut-out 77 from its rest position opposite gear wheel 75 and causes the first tooth to engage with a corresponding tooth in gear wheel 75. Gear wheel 75 therefore commences an anticlockwise revolution. Gear wheels 75 and 69 are of substantially the same radius, so that one complete revolution of gear wheel 69 will cause gear wheel 75 to make one complete revolution. While gear wheel 75 is controlled by gear wheel 69, the arm 55 is out of the path of arm 59 so there is no obstacle to shaft 25 revolving. Also the control of the shaft 25 by the friction clutch 49 is overridden during this period.

Therefore during one complete revolution of shaft 64, gear wheel 75 and scanning drum 26 perform one anticlockwise revolution, are brought to rest, and then perform one clockwise revolution. These movements, enable the wrapper 27 to be transferred from scanning drum 26 to stripper drum 32, a sheet 12 to be fed in from the magazine, and the wrapper to be transferred back to the scanning drum 26, as already described.

At the completion of the anti-clockwise revolution of gear wheel 69, the cut-out 77 in this gear wheel is again exactly opposite gear wheel 75, so that shaft 25 is again free to be driven from shaft 43 through the friction clutch 49.

(b) Operation of Electrical Contacts

The way in which the motor is energised at the beginning of transmission and maintained in an energised condition when a further message is to be sent will now be described with reference to FIGS. 12 and 13. The method by which the movement of the scanning unit causes the calling, phasing and stop signals to be sent to the recorder will also be described in connection with these figures.

The scanning unit 36 is arranged to move operating bar 78 longitudinally to each of three positions in turn by pressing on projections 79 and 80. These three positions comprise two positions of stable equilibrium and one of unstable equilibrium, and may be defined by means such as that shown in FIG. 13. Referring to FIG. 13, the operating bar 78 is shown to have an extension 81 containing two V-shaped portions 82 and 83. A roller 84 is spring urged in the direction of the V-shaped portions 82, 83, by spring 85 and in the two positions of stable equilibrium the roller is pressed right down in either 82 or 83 (see FIGS. 13b and 13c respectively). The position of unstable equilibrium is that shown in FIG. 13a where roller 84 is not resting squarely in the V-shaped portion 82, but is maintained past this position by the pressure of scanning unit 36 on projection 80.

In the rest position of the transmitter the scanning unit 36 is at rest against projection 80, maintaining the bar 78 in the position of unstable equilibrium as shown in FIG. 13a. To start the transmitter, the operator presses the start button 86 (which is shown in FIG. 12 in the operated position). This operates member 40 (FIG. 11) as already described, and also presses down an arm 87 (FIG. 12) against the action of a spring 88. Arm 87 is one of four connected arms 87, 89, 90 and 91 pivoted at 92. As arm 87 is pressed down, it moves in a clockwise direction (as shown in FIG. 12) and the other arms 89, 90, 91 also move in a clockwise direction about pivot 92. Arm 89 thus engages an arm 93 and moves this arm 93 in an anticlockwise direction about its pivot 94 against the action of spring 95. This movement of arm 93 closes contacts 96 in the circuit of motor 42, thus energising the motor 42.

In the rest position of the transmitter, arm 87 held an arm 97, pivoted at 98 against the action of a spring 99. The operation of the start button 86, however, caused arm 87 to release arm 97 which therefore moved under the action of spring 99 until it abutted against stop 100. In this position, as shown in FIG. 12, arm 97 latches arm 87 in the operated position, so that the contacts 96 in the motor circuit remain closed when the start button 86 is released.

The operation of member 40, as described in connection with FIG. 11 caused the ratchet 50 to engage and cam sleeve 66 to be driven. In addition to the cams already mentioned, cam sleeve 66 contains cams 101 and 102 which are shown diagrammatically in FIG. 12. Therefore these cams 101 and 102 start to revolve when the start button 86 is operated. Cam 101 is arranged to maintain contacts 96 closed during each whole revolution of cam sleeve 66, because the projection 103 falls into the hollow 104 on cam 101 only at the completion of the revolution. This ensures that all the functions which are performed from the cam sleeve 66 are performed before the sleeve is brought to rest. Cam 102 is arranged to close the contacts 105, 106 in the calling and phasing signal circuits. This is done when the projection 107 on arm 108 falls into the cut-out 109 on cam 102 under the action of spring 110, which action is designed to occur as near the end of the revolution of cam 102 as possible.

This movement of arm 108 causes arm 111, cooperating therewith, to move in an anticlockwise direction about its pivot 112, moving with it a connected arm 114 against the action of spring 113. Arm 114 causes the contacts 105, 106, to close and the calling and phasing signals are sent to the recorder. As arm 114 is moved under the action of cam 102 it is forced into latch engagement with arm 115, which is pivoted at 116, and held under the action of spring 117. The calling and phasing signals are therefore maintained until a go-ahead signal is received by the transmitter. This signal causes other contacts (not shown in FIG. 12) to be opened preventing further calling or phasing signals from going to the line, even though contacts 105, 106 remain closed.

On receipt of the go-ahead signals by the transmitter, scanning commences. This may be performed by any known mechanism. Scanning unit 36 moves out of pressure contact with projection 80 and allows the operating bar 78 to move from the position of unstable equilibrium to the position of stable equilibrium shown in FIG. 13b. The transmitter controls are then all in the positions in which they are shown in FIG. 12. When scanning is completed the scanning unit 36 has moved to the left end of the operating bar 78 and presses against projection 79, moving the bar 78 to the left so that it comes into the other position of stable equilibrium as shown in FIG. 13c.

During the movement of operating bar 78 to the position of FIG. 13c, the members 118, 119 and 120 perform various functions. Member 118 closes the stop signal contacts 121 and causes the stop signal to be sent to the recorder. Member 120 operates on arm 115 moving it anticlockwise against spring 117, and thereby unlatching arm 114 which is free to move under the action of its spring 113 to open contacts 105 and 106.

As member 119 moves to the left, it moves with it arm 123. Arm 123 is attached to a pivot 124 on which there are also pivoted two other arms 125 and 126. During the first part of the movement of arm 119 to the left, arm 126 strikes arm 97, moving it anticlockwise against spring 99 and unlatching arm 87 which is then free to move back to its rest position. Arm 125 which had previously been prevented from striking stop 128 under the action of spring 127 by stop arm 135 now impinges on stop 127, and further movement to the left causes arms 125 and 126 to pivot clockwise about point 124. The end of arm 126 is thus swung clear of the end of arm 97 which would be free to move back against stop 100 if it were not for the fact that arm 87, in its release position, prevents it.

At this extent of its traverse, scanning unit 36, through the abutment of its member 41 with the member 40 of the control unit 15 already described in connection with FIG. 1, causes the transmitted message to be unloaded and a fresh one to be loaded. While the unloading and loading is proceeding, the scanning unit is being returned quickly to the right-hand end of its traverse (as seen in FIG. 12).

During the loading of the next message the rod 4 associated with this next message is forced forwards under the desk 1 (FIG. 1) and against tooth 6c, by the cam face 6d. The arm 91 has a projection 129 on it, and as rod 4 is forced forwards by cam face 6d it moves from the position shown in FIG. 12 to a position directly under this projection 129. Arm 91 and it associated arms 87, 89, 90, are therefore moved clockwise against spring 88, and arm 87 again latches arm 97. During the period when arms 87, 89, 91 were released, the motor contacts 96 were kept closed by arm 130 which is one of a pair of connected arms 130, 132 pivoted at 131. These arms are urged in an anticlockwise direction by spring 133 against stop 134, and are forced against stop 134 in both the positions of stable equilibrium of operating bar 78, spring 133 being stronger than spring 95. When the scanning unit 36 has completed its return run and pushed operating bar 78 through the stable position shown in FIG. 13b to the unstable position shown in FIG. 13a, the member 119 operates on arm 132 to move it in a clockwise direction about pivot 131 against spring 133. Arm 130 therefore releases arm 93 and would allow the contacts 96 to open, were it not for the fact that, by this time, the next rod 4 has been forced into position under the projection 129 of arm 91 and arm 89 has re-engaged arm 93 to keep contacts 96 closed. The transmission thus proceeds with another scan.

If there is no further message in the magazine, there will be no further rod 4 to be forced forward during the next loading cycle. Therefore arm 89 will not be moved back to the position in which it keeps contacts 96 closed, and when the scanning unit 36 pushes operating bar 78 into position shown in FIG. 13a and member 119 engages arm 134, the motor circuit will be cut off and transmission will cease.

It should be noted that the phasing signals are sent out under control of cam 102 which is arranged to operate after the scanning unit has moved operating bar 78 to the position shown in FIG. 13b and as near the end of the loading operation as possible. To ensure that the recorder does not get in phase quickly and send the go-ahead signal to start scanning before the completion of the loading operation, it may be necessary to use a recorder having a delayed response, e.g. a recorder which responds only on receipt of ten pulses. If another message has been loaded, arm 87 will be relatched with arm 97 and arm 90 will allow arm 114 to latch with arm 115. However, if no other message has been loaded then arm 90 will hold arm 115 out of latch engagement with arm 114 and contacts 105, 106 will be closed only momentarily under the action of cam 102 and arm 108. As contacts 105 and 106 are not the only pair of contacts in the calling and phasing signal circuits, and there is a slight time interval between the closing of contacts 105, 106 and the closing of the second sets, contacts 105, 106 will have opened again by the time the second sets have closed and no calling or phasing signals will be sent to the line.

SCANNING HEAD DRIVE MECHANISM

Referring to FIG. 14, the scanning head, which may be of any known type and which will not be described here, is mounted on a frame as one unit 36, having bearing surfaces 137 co-operating with guide rails 136. The scanning unit 36 is thus free to travel along the guide rails 136 parallel to the axis of the scanning drum 26.

A pin 138 is rigidly attached to the scanning unit 36. Motion along the rails 136 is imparted to scanning unit 36 through pin 138 by a link 139 which is driven by a pin 140 rigidly attached to a flexible belt 141 mounted on a driving pulley 142 and an idler pulley 143.

The driving pulley 142 is driven via shaft 144 (FIG. 15), friction clutch 145, shaft 146 and gear wheel 147. Gear wheel 147 is driven from motor 148 by either one of two paths, the paths being for fast and slow drives respectively.

The fast drive path is from motor 148 via its shaft 149, gear 150, gear 151, shaft 152, dog clutch 153, shaft 154 and gear 155 to gear wheel 147, and thence to driving pulley 142. Gear 151 is small in diameter compared with gear 150, while gear 155 has a diameter of similar size to gear 147. The slow drive path is from motor 148, via shaft 149, gear 150, gear 156, shaft 157, friction clutch 158, shaft 159 and gear 160 to gear 147 and thence to driving pulley 142. Gear 156 is of a similar size to gear 150 while gear 160 is small in comparison with gear 147. The slow drive imparts a motion to the scanning head appropriate to the scanning of a message form, while the fast drive imparts a motion suitable for scanning unoccupied parts of the drum and for returning the scanning head to the standby position.

Whether the scanning head is driven at the fast or slow speed is determined by the engagement or disengagement of dog clutch 153, which is controlled by member 161. (The way in which member 161 is controlled from the axial paper sensing mechanism will be described in connection with FIGS. 16 to 19.) When dog clutch 153 is disengaged, no drive is imparted to gear wheel 147 by the drive path 151, 152, 153, 154, 155, so gear wheel 147 is driven by the slow drive path 156, 157, 158, 159, 160. When dog clutch 153 is engaged, clutch 145 is driven forcibly by motor 148 via members 149, 150, 151, 152, 153, 154, 155, 147 and 146. In this condition shafts 159 and 157 rotate at different speeds, and this difference is accommodated by slipping friction clutch 158. The slow drive path 156, 157, 158, 159, 160, is thus overridden when clutch 153 is engaged.

Friction clutch 145 is provided to allow the belt 141 and pulley 142 and 143 to be stopped, even when dog clutch 153 is engaged. The stopping of the belt 141 and pulleys 142 and 143 is performed by the interception of a stop arm 162 attached to shaft 144 by a detent 163 pivoted at 164 and brought into co-operation with arm 162 by the force exerted by electro-magnet 165 under the control of current in its winding 166. This force is sufficient to overcome spring 266. The belt 141 may be stopped in as many positions as may be required by adding any number of members such as 162 to shaft 144. The belt 141 is released again by the removal of detent 163 from the path of stop arm 162 on receipt of a go-ahead signal.

In a facsimile transmitter in which message sheets of a standard size are used, the fast drive path will be used only for returning the scanning head to the standby position. The change-over from slow to fast drive (i.e. operation of member 161) may be effected by the scanning head operating a member at the conclusion of the scanning operation, or it might be dependent on the angular position of link 139. It will be seen from the following description of the axial paper sensing mechanism, that the particular embodiment of the invention herein described uses a method of moving a shoe over a plurality of members forming a surface the shoe being caused to raise a latch and disengage the dog clutch 153 during the scanning operation, while it yields to lower the latch and engage the dog clutch 153 during the return drive.

AXIAL PAPER SENSING MECHANISM

The way in which the width and position of the message sheet on the scanning drum is determined, and the way in which this information is used to control dog clutch 153 so that the slow drive is used only over that portion of the message drum which is occupied by a message sheet will now be described with reference to FIGS. 16, 17, 18 and 19.

The principle adopted is to provide a plurality of sensing members which are simultaneously lightly impelled so that one extremity of each member approaches and attempts to pass through the plane through which all messages forms must pass during their transfer from the magazine to the drum. This sensing action is caused to be synchronous with the transfer of the message form, so that some of the sensing members impinge on the form and are arrested by it, whilst others pass through the plane to the full extent of their permitted movement. In the embodiment described the sensing action is performed by allowing the sensing members to fall under gravity, but the action could equally well be performed by impelling them under the action of a light spring.

Immediately the condition is reached wherein the sensing members have adopted their differential positions, a chopper member takes effect and prevents further movement of the sensing members, so that, notwithstanding the completion of the transfer of the message form to the drum and the concomitant vacation by the paper of the plane in which it intercepted the sensing fingers, the latter maintain their positions and so preserve the information as to the part of the drum on which the message lies.

Each sensing member is provided with a surface over which a shoe, carried by the scanning head, may glide. The complete series of such surfaces form an effectively continuous surface having a contour corresponding to the presence and absence of paper on the drum. Registration between the paper and the contoured surface is ensured by arranging that the shoe carried by the scanning head is opposite the optical scanning point.

Figure 16:
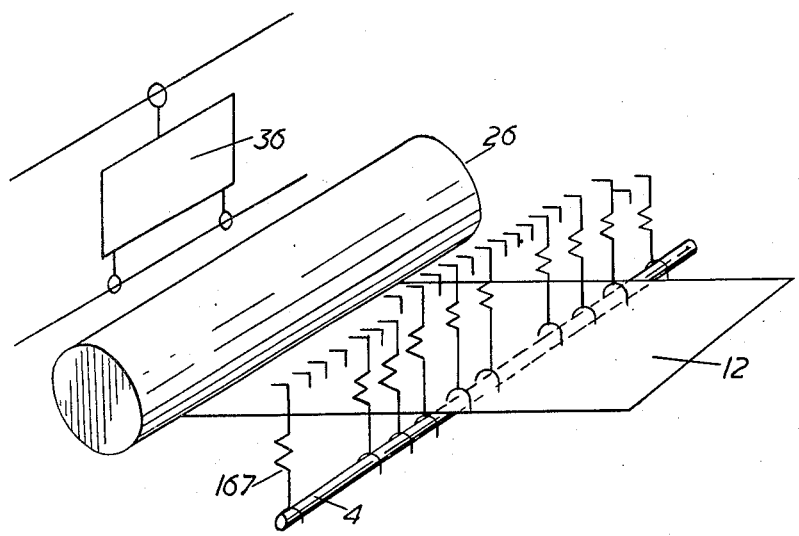

Referring first to FIG. 16, the message sheet 12 is shown in the position between the magazine (not shown in this figure) and the scanning drum 26 which it occupies immediately before being wound into the scanning drum 26 inside the transparent wrapper (not shown). In this position a rod 4 is situated below the sheet 12, and immediately above the rod 4 there is a series of sensing members 167 which are capable of motion in a direction normal to the plane of the message sheet 12. Each of the sensing members 167 has a forked end which may either impinge on the sheet 12 or, where there is no sheet, move further downwards to straddle the rod 4. The positions which the sensing members 167 occupy in the operation position are shown in FIGS. 17 and 18.

Figure 17:
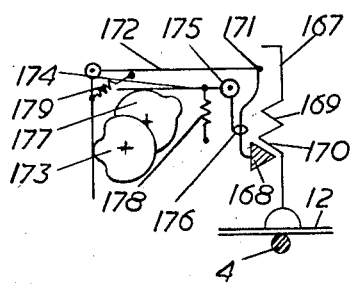

Referring to FIGS. 17 and 18, there is provided a chopper bar 168 which is of sufficient length to embrace the whole series of members 167 and which co-operates with projections 169 and 170 on members 167.

The chopper bar 168 is supported pivotally at the extremity 171 of a bellcrank 172, the other extremity of which is held in engagement with the surface of a cam 173 by a spring 179. Cam 173 is another one of the series of cams on cam sleeve 66 shown in FIG. 11.

Another bellcrank member 174 is pivoted at 175 and has a claw 176 which embraces the support of chopper bar 168 as shown in FIG. 17 and 18. Bellcrank member 174, through its claw 176, can therefore swing chopper bar 168 towards the sensing members 167 or away from them as dictated by another cam 177 with which it is held in engagement by spring 176. Cam 177 is a further one of the cams on cam sleeve 66 already referred to.

The sequence of events in the operation of this sensing mechanism is controlled by cams 173 and 177 and will now be described in detail.

As a message sheet 12 is fed from the magazine to the scanning drum 26, the bar 168 is in contact with the sensing members 167 having been impelled to this position by cam 177. Members 167 may be assumed to be in their highest position so that their projections 170 are above bar 168, and bar 168 supports members 167 in that position.

Rotation of cam 177 causes bellcrank 174 to move clockwise against the action of spring 178 and withdraw bar 168 from members 167 which then become unsupported and drop towards rod 4. Some of the members 167 are intercepted in their fall by message sheet 12 (as shown in FIG. 17) while others are beyond the edges of sheet 12 and so drop further to the position shown in FIG. 18. After this opportunity to drop has been afforded to members 167, cam 173 forces bellcrank 172 in a clockwise direction against spring 179, thereby lowering bar 168 to the position shown in FIGS. 17 and 18. Then bar 168 is allowed to move into co-operation with either projection 169 (as in FIG. 18) or projection 170 (as in FIG. 17) of member 167, depending on the position of member 167, by cam 177. The sensing members 167 are therefore retained in the positions they have adopted, in spite of the eventual transfer of the sheet 1 to the scanning drum 26.

As soon as possible after bar 168 has renewed its co-operation with members 167, cam 173 allows bellcrank 17 to be moved in an anti-clockwise direction by spring 179. Pivot 171, bar 168 and members 167 are therefore all raised. The pressure of members 167 is thus removed from message sheet 12 and the transfer of this sheet to the scanning drum is facilitated, and at the same time members 167 are brought to a sufficiently high position from which they are ready to drop afresh on to the next message sheet during the next loading action. It should be noted that, during the raising action, members 167 preserve their relative positions which define the width of the message sheet.

This information of the width of the message sheet is utilised to control the operation of dog clutch 153 by member 161. This utilisation mechanism includes a gliding shoe carried by the scanning head, the gliding shoe rising and falling as it rides over the upper extremities, of sensing members 167. This motion of the gliding shoe, raises and lowers a bail carried on a rockshaft. The rockshaft thus has two angular positions corresponding to the high or low positions of the sensing members 167, and is therefore able to cause engagement and disengagement of the dog clutch 153 via a linkage provided for this purpose.

Referring to FIG. 19, scanning unit 36 having its optical pick-up axis at 180 carries an extension 181 upon which is pivoted arm 182. Arm 182 is a T-shaped arm, one portion of the T being positioned beneath a bail 186 and the other portion of the T carrying a shoe 183.

Shoe 183 is pivotally attached to arm 182 and urged by spring 184 against a stop face 185, which is integral with arm 182. The purpose of this arrangement is to ensure that whilst the carriage is moving in the scanning direction the shoe 183 abuts stop 185, and when raised members 167 are encountered the arm 182 is raised, and that whilst the carriage is returning spring 184 yields when shoe 183 encounters raised members 167 so that shoe 183 pivots and arm 182 is not raised.

Resting on arm 182 is a bail 186 carried on arms 187 and 188 extending from rockshaft 189. Thus, when shoe 183 encounters raised members 167 and arm 182 rises bail 186 is raised by arm 182 and rockshaft 189 moves clockwise. Arm 190 extending from rockshaft 189 is connected by pivoted link 191 to the member 161 in such a way that raising of bail 186 results in the dog clutch 153 being disengaged. This may be performed in any well known manner.

CIRCUMFERENTIAL PAPER SENSING MECHANISM

The way in which the width of the message sheet is determined and the way in which this information is used to adjust the period during each drum revolution for which the blanking signal is injected into the picture channel will now be described with reference to FIGS. 20 and 21.

The message drum shaft 25 is provided with a cam 192, controlling contacts 193, and a ratchet wheel 194. Coupled to shaft 25 by friction clutch 197 is a further shaft 196 carrying a cam 198, controlling contacts 199, and an arm 200 to the extremity of which is pivoted pawl 201.

Pawl 201 is urged by spring 202 to engage with ratchet wheel 194 and is provided with a tail 203 adapted to cooperate with arm 204 extending from shaft 205. Arm 204 is urged by spring 206 towards stop 209. Also extending from shaft 205 are several sensing members such as 207 and 208 which bear on the message form 12 during that phase of its transfer to the scanning drum 26 in which it passes over supports 210 and 211. The extremities of members 207, 208 are contoured so that they are capable of dropping into the gap between supports 210 and 211 when the message form 12 has travelled sufficiently far for its trailing edge to clear the gap between these supports 210 and 211.

Figure 11:
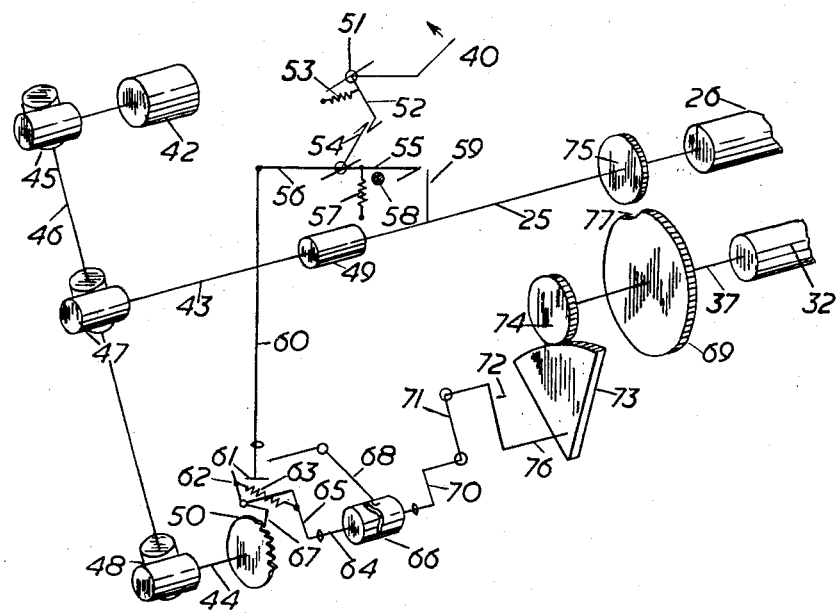
FIG. 11 shows schematically the operation of the mechanical control apparatus associated with FIG. 1
Figure 11A:
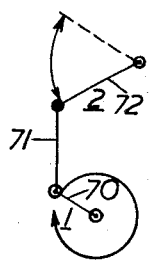
FIG. 11A shows schematically a detail thereof.

A further member 215 pivoted at 212 is urged by spring 213 towards cam 214, which is one of the series of cams on cam sleeve 66 (see FIG. 11). When member 215 falls into the depression on cam 214 its other extremity 216 enters the orbit of arm 200.

During the unloading of a scanned message shafts 25 and 196 move anticlockwise, so that arm 200 moves anticlockwise in its orbit and member 215 is, during that time, lowered into the depression in cam 214. Consequently, extremity 216 of member 215 is in the path of arm 200 and the tension in spring 213 is such that, when abutment occurs, friction clutch 197 slips until drum 26 and shaft 25 reach the limit of their angular motion. While this slippage occurs, pawl 201 trails over the teeth of ratchet 194. At the cessation of the slippage, cam 214 will have been set at a known angular position with respect to drum 26, this position being so chosen that the contacts 193 and 199 both close at the moment when the point of attachment of wrapper 27 to drum 26 passes under the pick-up axis of the scanning head.

During the loading phase of the unload/load cycle the shafts 25 and 196 move in a clockwise direction, the message form 12 is caused to move leftwards over supports 210 and 211, and sensing members 207 and 208 are raised so that arm 204 is lowered into the orbit of tail 203 of pawl 201. Pawl 201 therefore tilts anticlockwise about its pivot 218 and is disengaged from ratchet 194. The pawl 201 reaches the limit of its rotation about pivot 218 as determined by its stop face 219 abutting arm 200, and thereafter friction clutch 197 slips, thus causing a change of orientation of cam 198 with respect to cam 192. This slippage continues until the trailing edge of message form 12 has passed beyond the gap between supports 210 and 211 when sensing members 207, 208 drop into the gap and arm 204 is moved out of the orbit of tail 203 of pawl 201. Pawl 201 engages with ratchet 194 and thereafter shafts 25 and 196 rotate together. The angular slippage, and therefore the difference of orientation of cams 192 and 198 having been dependent on the size of the message form, is, by suitable geometry, made to correspond precisely with the extent of the unoccupied part of the drum.

Contacts 193 and 199 are caused to control a bistable device 220 which delivers a mark signal over conductor 221 or a space signal over conductor 222, according to which of the contacts 193 and 199 was the last to close, and by modulator 223 impresses a white signal on outgoing chanel 224 despite the presence of any black signal, as determined by scanner and amplifier 225 controlling carrier current from source 226 by modulator 227, at the input to modulator 223.

While the principles of the invention have been described above in connection with specific embodiments, and particular modifications thereof, it is to be clearly understood that this description is made only by way of example and not as a limitation on the scope of the invention.

What I claim is:

1. Facsimile apparatus including a magazine for storing a plurality of message sheets preparatory to transfer into scanning position, said magazine comprising a plurality of separating members, for insertion between said plurality of message sheets in such a manner that the individual message sheets are separated from each other in said magazine by one of said separating members, storage rack means supporting said separating members to urge the said sheets into scanning position and mechanism for successively advancing said message sheets from said magazine into said scanning position.

2. Facsimile apparatus as claimed in claim 1, further comprising means for ejecting a message sheet from said scanning position.

3. Facsimile apparatus as claimed in claim 1, in which said magazine comprises a base member for supporting message sheets at their edges and, a desk member mounted above the base and inclined from the vertical for supporting the sides of the message sheets, the said storage rack means being inclined from the horizontal to cause separating members stored thereon to be urged by gravity towards the desk member at a point near the base member.

4. In facsimile equipment according to claim 3, a manually operable frame having an escapement thereon normally holding said separating members against travel down said inclined rack but operable to cause said escapement to release said separating members one at a time for movement down said inclined rack to bring each separating member against a separate message sheet so as to hold a plurality of message sheets each separated from the next by one of said separating members in resting position against said desk member.

5. Facsimile apparatus as claimed in claim 4 comprising a further escapement holding said separating members in said position in which said message sheets are held against said desk member, a pressure roller, a feed roller and means for releasing said further escapement, means for moving said pressure roller to press the lower portion of a message sheet against said feed roller and means for rotating said feed roller to advance said message sheet from said magazine into scanning position.

6. Facsimile apparatus as claimed in claim 5 comprising a first drum, means including the rotation of said feed roller to advance said message sheet into contact with the surface of said first drum, a second drum having a transparent wrapper therearound and means for rotating both drums to wrap said message sheet around said first drum, to unwind said transparent wrapper from said second drum and to wrap it round said message sheet on said first drum.

7. Facsimile apparatus comprising a magazine for holding a plurality of message sheets preparatory for transfer into scanning position, said magazine comprising a base member for supporting message sheets at their edges, a desk member mounted above the base and inclined from the vertical for supporting the sides of the message sheets, and a storage rack inclined from the horizontal to cause separating members stored thereon to be urged by gravity towards the desk member at a point near the base member, an escapement for holding said members against movement down said rack, manually operable means for reciprocating the escapement to allow one member at a time to move down the rack each into contact with an associated message sheet for loading said magazine, and means for automatically seizing one message sheet at a time from said magazine and placing the said message sheet in a scanning position.

8. Facsimile apparatus as claimed in claim 7, in which said means for seizing a message sheet comprises a feed roller, a pressure roller, means for advancing one of said separating members together with an adjacent message sheet to bring the edge of said sheet between said pressure roller and said feed roller, means for moving the pressure roller to hold said edge against said feed roller and means for rotating said feed roller.

9. Facsimile equipment according to claim 7, wherein the means for automatically seizing one message sheet at a time from said magazine and placing the message sheet in scanning position includes means for seizing the sheet immediately adjacent the desk member.

10. Facsimile apparatus according to claim 7, wherein the said means for automatically seizing and placing the message sheet into scanning position comprises means for advancing the message sheet immediately adjacent the desk member and the associated separating member through the plane of said storage rack, a feed roller, a pressure roller, and means operable subsequent to the operation of the said advancing means for moving the pressure roller to hold the advanced message sheet against the feed roller for movement into scanning position.

References Cited in the file of this patent
UNITED STATES PATENTS

| | | |
|---|---|---|
| 1,163,669 | Kourian | Dec. 14, 1915 |
| 1,449,668 | Grammer | May 27, 1923 |
| 1,719,392 | Cooley | July 2, 1929 |
| 2,287,413 | Bruce | June 23, 1942 |
| 2,561,030 | Morse | July 17, 1951 |
| 2,670,954 | Bach | Mar. 2, 1954 |
| 2,734,743 | Spurlino | Feb. 14, 1956 |